US006762902B2

United States Patent
Chew

(10) Patent No.: US 6,762,902 B2
(45) Date of Patent: Jul. 13, 2004

(54) TIME-VARYING, NON-SYNCHRONOUS DISTURBANCE IDENTIFICATION AND CANCELLATION IN A ROTATING DISK STORAGE DEVICE

(75) Inventor: Kok-Kia Chew, Fremont, CA (US)

(73) Assignee: Samsung Electronics Co., Ltd. (KR)

( * ) Notice: Subject to any disclaimer, the term of this patent is extended or adjusted under 35 U.S.C. 154(b) by 485 days.

(21) Appl. No.: 09/974,698

(22) Filed: Oct. 9, 2001

(65) Prior Publication Data

US 2002/0109934 A1 Aug. 15, 2002

Related U.S. Application Data

(60) Provisional application No. 60/256,226, filed on Dec. 15, 2000.

(51) Int. Cl.$^7$ ............................................... G11B 5/596
(52) U.S. Cl. .................................. 360/78.04; 360/77.04
(58) Field of Search ........................... 360/78.04, 77.04, 360/78.06, 78.07, 78.08, 75, 77.01, 77.02, 78.09

(56) References Cited

U.S. PATENT DOCUMENTS

| | | |
|---|---|---|
| 4,371,902 A | 2/1983 | Baxter et al. |
| 4,539,662 A | 9/1985 | Hatano et al. |
| 4,677,568 A | 6/1987 | Arbter |
| 4,802,033 A | 1/1989 | Chi |
| 4,811,135 A | 3/1989 | Janz |
| 4,812,726 A | 3/1989 | Benii et al. |
| 4,823,212 A | 4/1989 | Knowles et al. |
| 4,890,172 A | 12/1989 | Watt et al. |
| 4,937,689 A | 6/1990 | Seaver et al. |
| 4,977,472 A | 12/1990 | Volz et al. |
| 4,979,056 A | 12/1990 | Squires et al. |
| 4,982,295 A | 1/1991 | Yakuwa et al. |
| 5,036,408 A | 7/1991 | Leis et al. |
| 5,050,146 A | 9/1991 | Richgels et al. |

(List continued on next page.)

FOREIGN PATENT DOCUMENTS

| | | |
|---|---|---|
| EP | 0 263 962 A2 | 4/1988 |
| EP | 0 441 407 A1 | 8/1991 |
| EP | 0 543 654 A2 | 5/1993 |
| EP | 0 601 855 A2 | 6/1994 |
| EP | 0 663 766 A1 | 7/1995 |
| EP | 0 717 559 A2 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| GB | 2 342 492 A | 4/2000 |
| WO | WO 93/09480 | 5/1993 |
| WO | WO 95/24035 | 9/1995 |
| WO | WO 96/23305 | 8/1996 |

Primary Examiner—David Hudspeth
Assistant Examiner—Fred F. Tzeng
(74) Attorney, Agent, or Firm—Irell & Manella LLP; Jeffrey P. Aiello

(57) ABSTRACT

A method, apparatus, or product for a rotating disk storage device. In one embodiment, the apparatus includes a disk, a spindle motor that rotates the disk, a transducer, an actuator arm that can move the transducer, and a controller. The controller can control the movement of the actuator arm to move the transducer across the disk surface from a first track to a second track, and determine a position error signal (PES) at one or more positions between the first and second tracks, where the PES includes a non-repeatable disturbance signal. The controller can iteratively generate a disturbance correction signal at the one or more positions based on the PES, combine the disturbance correction signal with the PES to minimize the non-repeatable disturbance signal to provide a corrected PES, and vary, at the one or more positions, the movement of the transducer as a function of the corrected PES.

15 Claims, 6 Drawing Sheets

U.S. PATENT DOCUMENTS

| | | | |
|---|---|---|---|
| 5,053,899 A | 10/1991 | Okawa et al. | |
| 5,111,349 A | 5/1992 | Moon | |
| 5,155,422 A | 10/1992 | Sidman et al. | |
| 5,182,684 A | 1/1993 | Thomas et al. | |
| 5,210,662 A | 5/1993 | Nishijima | |
| 5,235,478 A | 8/1993 | Hoshimi et al. | |
| 5,255,136 A | 10/1993 | Machado et al. | |
| 5,291,110 A | 3/1994 | Andrews, Jr. et al. | |
| 5,333,140 A | 7/1994 | Moraru et al. | |
| 5,369,345 A | 11/1994 | Phan et al. | |
| 5,408,367 A | 4/1995 | Emo | |
| 5,448,429 A | 9/1995 | Cribbs et al. | |
| 5,450,249 A | 9/1995 | Nagaraj et al. | |
| 5,452,285 A | 9/1995 | Monen | |
| 5,453,887 A | 9/1995 | Negishi et al. | |
| 5,465,034 A | 11/1995 | Andrews, Jr. et al. | |
| 5,465,035 A | 11/1995 | Scaramuzzo, Jr. et al. | |
| 5,475,545 A | 12/1995 | Hampshire et al. | |
| 5,500,776 A | 3/1996 | Smith | |
| 5,523,902 A | 6/1996 | Pederson | |
| 5,570,247 A | 10/1996 | Brown et al. | |
| 5,581,420 A | 12/1996 | Chainer et al. | |
| 5,583,712 A | 12/1996 | Brunelle | |
| 5,587,850 A | 12/1996 | Ton-that | |
| 5,600,506 A | 2/1997 | Baum et al. | |
| 5,606,469 A | 2/1997 | Kosugi et al. | |
| 5,608,587 A | 3/1997 | Smith | |
| 5,615,058 A | 3/1997 | Chainer et al. | |
| 5,631,783 A | 5/1997 | Park | |
| 5,640,423 A | 6/1997 | Archer | |
| 5,657,179 A | 8/1997 | McKenzie | |
| 5,659,436 A | 8/1997 | Yarmchuk et al. | |
| 5,666,238 A | 9/1997 | Igari et al. | |
| 5,666,242 A | 9/1997 | Edwards et al. | |
| 5,677,609 A | 10/1997 | Khan et al. | |
| 5,680,270 A | 10/1997 | Nakamura | |
| 5,680,451 A | 10/1997 | Betts et al. | |
| 5,691,857 A | 11/1997 | Fitzpatrick et al. | |
| 5,696,647 A | 12/1997 | Phan et al. | |
| 5,710,677 A | 1/1998 | Teng et al. | |
| 5,715,105 A | 2/1998 | Katayama et al. | |
| 5,734,680 A | 3/1998 | Moore et al. | |
| 5,748,677 A | 5/1998 | Kumar | |
| 5,751,513 A | 5/1998 | Phan et al. | |
| 5,760,992 A | 6/1998 | Phan et al. | |
| 5,771,126 A | 6/1998 | Choi | |
| 5,771,130 A | 6/1998 | Baker | |
| 5,771,131 A | 6/1998 | Pirzadeh | |
| 5,774,299 A | 6/1998 | Baum et al. | |
| 5,796,543 A | 8/1998 | Ton-That | |
| 5,798,883 A | 8/1998 | Kim | |
| 5,867,337 A | 2/1999 | Shimomura | |
| 5,867,353 A | 2/1999 | Valent | |
| 5,875,066 A * | 2/1999 | Ottesen | 360/77.11 |
| 5,892,634 A | 4/1999 | Ito et al. | |
| 5,901,009 A | 5/1999 | Sri-Jayantha et al. | |
| 5,917,670 A | 6/1999 | Scaramuzzo et al. | |
| 5,930,067 A | 7/1999 | Andrews et al. | |
| 5,936,792 A | 8/1999 | Kobayashi et al. | |
| 5,946,157 A | 8/1999 | Codilian et al. | |
| 5,949,605 A * | 9/1999 | Lee et al. | 360/77.04 |
| 5,959,952 A | 9/1999 | Wakuda | |
| 5,978,752 A * | 11/1999 | Morris | 702/186 |
| 5,995,317 A * | 11/1999 | Ottesen | 360/77.04 |
| 6,049,441 A * | 4/2000 | Ottesen | 360/77.04 |
| 6,101,058 A * | 8/2000 | Morris | 360/69 |
| 6,118,616 A | 9/2000 | Jeong | |
| 6,140,791 A | 10/2000 | Zhang | |
| 6,178,060 B1 | 1/2001 | Liu | |
| 6,225,767 B1 | 5/2001 | Lovett et al. | |
| 6,476,995 B1 * | 11/2002 | Liu et al. | 360/75 |
| 6,580,579 B1 * | 6/2003 | Hsin et al. | 360/77.02 |
| 6,636,376 B1 * | 10/2003 | Ho | 360/77.02 |

\* cited by examiner

TIME-VARYING, NON-SYNCHRONOUS
DISTURBANCE IDENTIFICATION AND
CANCELLATION IN A ROTATING DISK
STORAGE DEVICE

REFERENCE TO CROSS-RELATED
APPLICATIONS

This non-provisional application claims priority to provisional application serial No. 60/256,226, filed on Dec. 15, 2000.

BACKGROUND OF THE INVENTION

1. Field of the Invention

The present invention relates generally to disk drives and more particularly to a method, apparatus, and computer program product for canceling or minimizing disturbances in rotating disk storage systems.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline and/or reference line of the track. The signals produced by the servo bits are demodulated and used to obtain a Position Error Signal (PES). The PES is used to calculate a correction current that is applied to the voice coil motor to move the actuator arm and head over the track centerline or reference line of a track.

In disk drives, the term "runout" is typically used to describe position error sources. These sources of disturbances increase the PES. The track runouts and external vibrations in disk storage systems are either repeatable or non-repeatable. When the frequencies of the external disturbances are synchronous to the disk rotation frequency, the disturbances are classified as repeatable. Otherwise, the disturbances are non-repeatable. Many techniques are widely used to identify and cancel repeatable runouts and external vibrations.

Non-repeatable disturbances are more difficult to identify and cancel because they typically involve changes/modulations in frequencies as well as amplitudes. Non-repeatable runouts are typically caused by defects in the bearing, spindle motor imperfections, noise, and servo loop response error.

One technique for handling non-repeatable runouts involves the use of a fixed compensator. A fixed compensator usually relies on high bandwidth to provide adequate attenuation in the frequency regime of the non-repeatable disturbance. This technique is typically expensive to implement due to the stringent design requirements placed on mechanical designs.

BRIEF SUMMARY OF THE INVENTION

Disclosed herein is a method for moving a transducer across a surface of a disk in a rotating disk storage device, where the rotating disk storage device is subjected to a non-synchronous disturbance signal. In one embodiment, the method includes moving the transducer across the disk surface, computing a design position of the transducer, determining an actual position of the transducer, and generating a position error signal (PES) at a plurality of positions between a source track and a destination track. The PES is a function of the design position, the actual position, and the non-synchronous disturbance signal. The method further includes generating a disturbance correction signal, at the plurality of positions, that is a function of the PES, providing a corrected PES, at the plurality of positions, that is function of the PES and the disturbance correction signal, and varying the movement of the transducer in response to the corrected PES.

Other embodiments are disclosed and claimed herein.

DETAILED DESCRIPTION OF THE INVENTION

Disclosed herein are a method, apparatus, and computer program product for canceling or minimizing non-synchronous disturbances in rotating disk storage systems. In one embodiment, a method includes moving the transducer across the disk surface, computing a design position of the transducer, determining an actual position of the transducer, and generating a position error signal (PES) at a plurality of positions between a source track and a destination track. The PES is a function of the design position, the actual position, and the non-synchronous disturbance signal. The method further includes generating a disturbance correction signal, at the plurality of positions, that is a function of the PES, providing a corrected PES, at the plurality of positions, that is function of the PES and the disturbance correction signal, and varying the movement of the transducer in response to the corrected PES.

Although embodiments disclosed herein describe a hard disk drive, the invention applies broadly to any rotating disk storage device or system.

Figure 1:
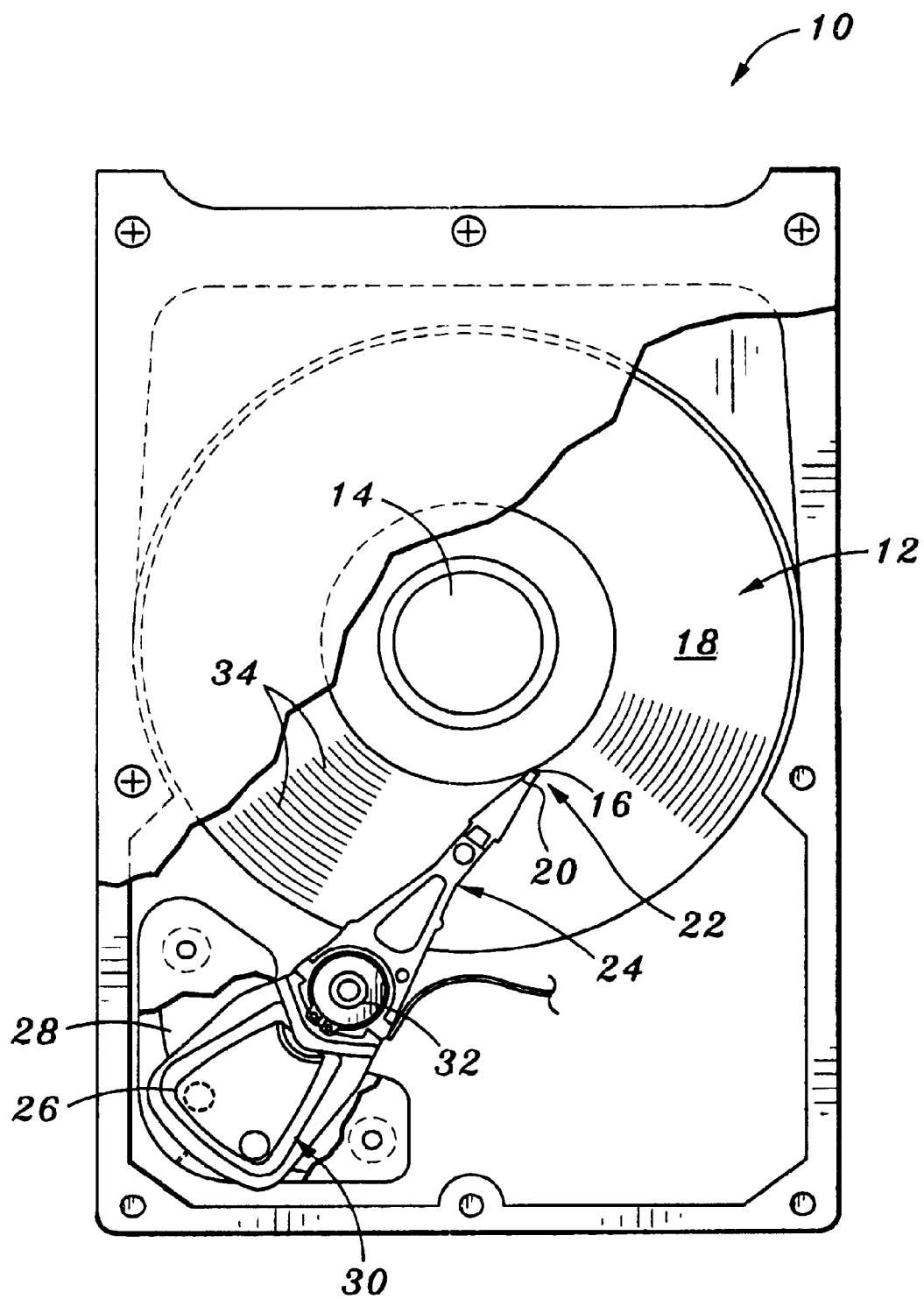
FIG. 1 is a top view of an embodiment of a hard disk drive of the present invention.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material.

The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
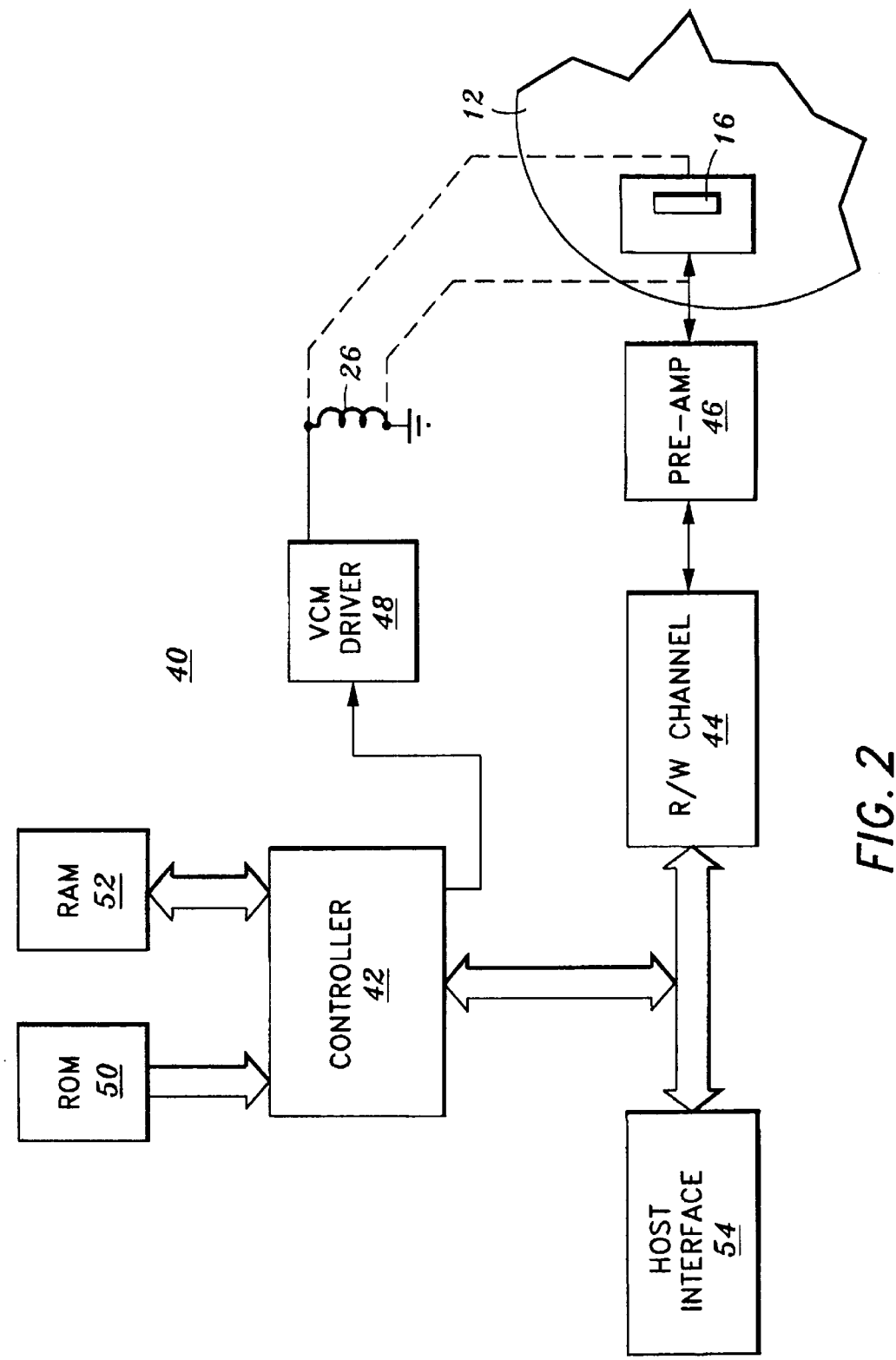
FIG. 2 is a schematic of an electrical system which controls the hard disk drive.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 54. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track. In one embodiment, the memory device 50 contains the acceleration, velocity, and position trajectory equations, as discussed hereinbelow, where such equations may be loaded into memory device 52 at startup. Moreover the memory device 50 may include one or more software routines for canceling or minimizing non-synchronous disturbances in hard disk drive 10 (FIG. 1), where such routine(s) may be loaded into the memory device 52 at startup.

Figure 3:
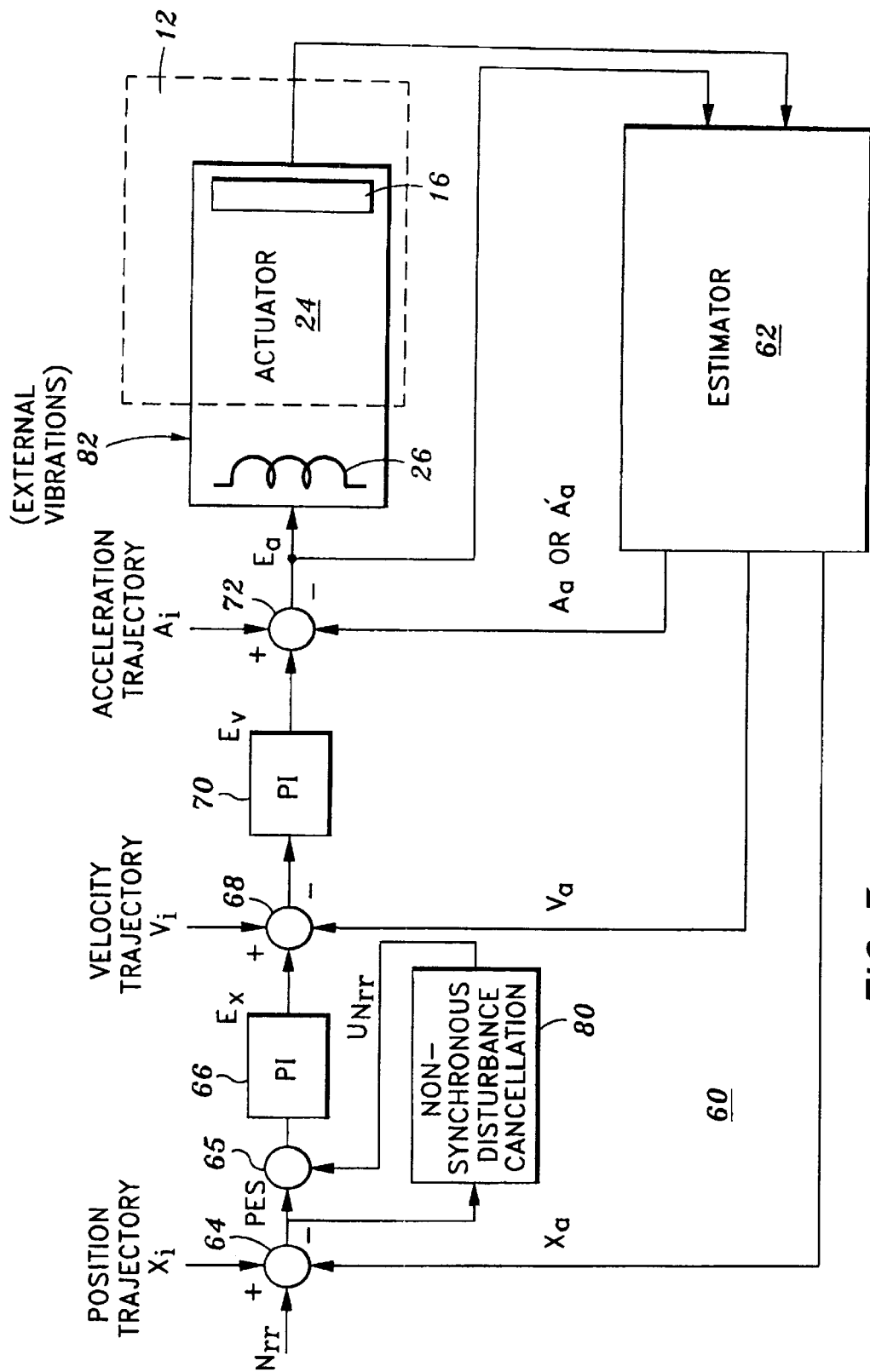
FIG. 3 is a schematic of a servo control system of the disk drive.

FIG. 3 shows a servo control system 60 that is implemented by the controller 42, according to one embodiment. The servo control system 60 may be implemented in hardware and/or software.

Referring to FIGS. 1 through 3, when the controller 42 performs a seek routine, the transducer 16 is moved from a first track to a new track located a distance $X_{SK}$ from the first track. The Gray codes of one or more tracks located between the new and first tracks are read as the transducer 16 moves across the disk 12. This allows the controller 42 to periodically determine whether the transducer 16 is moving at a desired speed or acceleration, or both, across the disk surface 18.

The control system 60 includes an estimator 62, which may be implemented in software and/or hardware. The estimator 62 can determine the actual distance or position $X_a$ that the transducer has moved from the first track. The position can be determined by reading the Gray code of a track beneath the transducer 16. The estimator 62 can also determine the actual velocity $V_a$ and actual acceleration $A_a$ of the transducer 16. The Gray codes can be periodically sampled as the transducer 16 moves to the new track location so that the controller 42 can correct the movement of the transducer 16 with the control system 60.

The controller 42 computes a design position $X_i$, a design velocity $V_i$ and a design acceleration $A_i$ of the transducer 16 each time the transducer reads the Gray code of a track 34.

The disk drive 10 including the actuator 24 and other components may be subjected to external non-synchronous disturbances, as shown by arrow 82. The servo control system 60 cancels or minimizes these non-synchronous disturbances and insures that the transducer 16 is accurately located on a desired track of the disk 12, as described herein. The non-synchronous disturbance signal is defined herein as $N_{rr}$.

The actual and design position trajectories $X_a$ and $X_i$, in addition to the non-synchronous disturbance signal $N_{rr}$, are inputs to the summing junction 64. The controller 42 computes the difference between the design position $X_i$, actual position $X_a$, and disturbance signal $N_{rr}$ at summing junction 64. The output of the summing junction 64 is the Position Error Signal (PES). To cancel out or minimize the non-synchronous disturbance, the PES is applied to a disturbance cancellation block 80, which may be implemented in hardware and/or software (e.g., executed by controller 42). The disturbance cancellation block 80 tracks the frequency of the disturbance signal $N_{rr}$, and generates a correcting signal $U_{Nrr}$ that is used to cancel or minimize the disturbance signal $N_{rr}$. The correcting signal $U_{Nrr}$ and the PES are applied to a summing junction 65 where the controller 42 computes the sum of the correcting signal $U_{Nrr}$ and the PES. A number of iterations may be required before the correcting signal $U_{Nrr}$ effectively cancels or minimizes the disturbance signal $N_{rr}$. The details of block 80 are provided below.

In block 66, the controller 42 computes a position correction value $E_x$ with a proportional plus integral control algorithm and the output of the summing junction 65. The actual velocity $V_a$ is subtracted from the sum of the design velocity $V_i$ and the position correction value $E_x$ at summing junction 68. In block 70, the controller 42 computes a velocity correction value $E_v$ with a proportional plus integral control algorithm and the output of the summing junction 68.

An acceleration correction value $E_a$ is computed by subtracting the actual acceleration $A_a$ from the sum of the design acceleration $A_i$ and the velocity correction value $E_v$ at summing junction 72. The acceleration correction value $E_a$ is used to increase or decrease the current provided to the voice coil 26 and to vary the acceleration of the movement of the transducer 16.

The acceleration correction value $E_a$ may also be provided to the estimator 62 to generate a feedforward acceleration value $A'_a$. The feedforward acceleration value $A'_a$ can be provided to summing junction 72 to provide a feedforward control loop.

The design acceleration $A_i$, velocity $V_i$, and position $X_i$ waveforms provided at the respective summing junction 72, 68, and 64 are described and shown below.

In one embodiment, the acceleration trajectory comprises a sinusoidal acceleration trajectory, as defined by the following equation:

$$a(t) = K_A I_M \sin\left(\frac{2\pi}{T_{SK}} t\right), \tag{1}$$

where;
  $K_A$=acceleration constant;
  $I_M$=maximum current provided to the voice coil; and
  $T_{SK}$=seek time required to move the transducer from the old track to the new track.

The following ideal velocity equation can be derived by integrating the acceleration equation.

$$v(t) = \int_0^t a(t)dt = K_A I_M \frac{T_{SK}}{2\pi}\left[1 - \cos\left(\frac{2\pi}{T_{SK}} t\right)\right]. \tag{2}$$

Additionally, the following ideal position equation can be derived by integrating the velocity equation.

$$x(t) = \int_0^t v(t)dt = K_A I_M \frac{T_{SK}}{2\pi}\left[t - \frac{T_{SK}}{2\pi}\sin\left(\frac{2\pi}{T_{SK}} t\right)\right]. \tag{3}$$

When the disk drive is in operation, the disk drive may receive a command to store or read information. The command may require that the transducer be moved from a first track to a new track in accordance with a seek routine. During a seek routine, the new track and corresponding distance (seek length $X_{SK}$) to the new track from the first track can be determined by the controller 42. The seek time may be initially computed before the ideal acceleration, ideal velocity, and ideal position are computed. The following relationship between $T_{SK}$ and $X_{SK}$ can be generated from equation (3) by setting $t=T_{SK}$.

$$T_{SK} = \sqrt{\frac{2\pi X_{SK}}{K_A I_M}}. \tag{4}$$

Instead of performing a square root operation, the controller can compute $T_{SK}$ from $X_{SK}$ by generating a number of sample points N between $t=0$ and $t=T_{SK}$ and storing the samples in a lookup table having N entries, and using the following linear interpolation algorithm to determine the seek time between sample points.

$$T_{SK} = T_{SK}^I + \frac{T_{SK}^{I+1} - T_{SK}^I}{X_{SK}^{I+1} - X_{SK}^I}(X_{SK} - X_{SK}^I). \tag{5}$$

During the servo routine, the system may take a number of samples which correlate to the different positions, velocities, and accelerations of the transducer as the transducer moves from one track to another track. It is desirable to discretize the ideal trajectories to correspond with the sampling of Gray codes so that the actual values can be subtracted from the ideal values at the summing junctions of the servo control shown in FIG. 3. To discretize the trajectories, equations (1), (2), and (3) are transformed into a sample domain (n) and equation (4) is substituted into the amplitude terms to generate the following equations.

$$a(n) = \frac{2\pi X_{SK}}{N_{SK}^2 T_{SM}^2}\sin\left(\frac{2\pi}{N_{SK}} n\right), \tag{6}$$

$$v(n) = \frac{X_{SK}}{N_{SK} T_{SM}}\left[1 - \cos\left(\frac{2\pi}{N_{SK}} n\right)\right], \text{ and} \tag{7}$$

$$x(n) = \frac{X_{SK}}{N_{SK}} n - \frac{X_{SK}}{2\pi}\sin\left(\frac{2\pi}{N_{SK}} n\right), \tag{8}$$

where;
  $T_{sm}$=the sampling time, computed from equation (4);
  $N_{SK}$=the total number of samples; and
  n=sample number. The sine and cosine values can be computed by utilizing look-up tables that are stored in memory. Alternatively, the sine and cosine values can be computed with the state equation and initial value of the following recursive sine wave generation algorithm.

$$\begin{bmatrix} x_c(n+1) \\ x_s(n+1) \end{bmatrix} = \begin{bmatrix} \cos\left(\frac{2\pi}{N_{SK}}\right) & -\sin\left(\frac{2\pi}{N_{SK}}\right) \\ \sin\left(\frac{2\pi}{N_{SK}}\right) & \cos\left(\frac{2\pi}{N_{SK}}\right) \end{bmatrix}\begin{bmatrix} x_c(n) \\ x_s(n) \end{bmatrix}, \begin{bmatrix} x_c(0) \\ x_s(0) \end{bmatrix} = \begin{bmatrix} M \\ 0 \end{bmatrix}, \tag{9}$$

which utilizes the following known trigonometric identities.

$$\cos\left(\frac{2\pi}{N_{SK}}(n+1)\right) = \cos\left(\frac{2\pi}{N_{SK}}\right)\cos\left(\frac{2\pi}{N_{SK}}n\right) - \sin\left(\frac{2\pi}{N_{SK}}\right)\sin\left(\frac{2\pi}{N_{SK}}n\right), \text{ and} \tag{10}$$

$$\sin\left(\frac{2\pi}{N_{SK}}(n+1)\right) = \sin\left(\frac{2\pi}{N_{SK}}\right)\cos\left(\frac{2\pi}{N_{SK}}n\right) - \cos\left(\frac{2\pi}{N_{SK}}\right)\sin\left(\frac{2\pi}{N_{SK}}n\right). \tag{11}$$

During the servo routine, the controller 42 computes the ideal position, ideal velocity, and ideal acceleration of the transducer at a first sample time, determines the actual position, velocity, and acceleration values and then processes the data in accordance with the control loop shown in FIG. 3 and described above. Second, third, etc. samples are taken and the process is repeated to provide a servo routine that controls the movement of the transducer 16.

The velocity of the transducer should not exceed a maximum value so that the transducer can accurately read Gray codes from the disk. From equation (2) the maximum velocity can be computed as follows:

$$V_{MAX} = K_A I_M \frac{T_{SK}}{\pi}. \tag{12}$$

Using equation (4) the maximum seek time and maximum seek length can be determined as follows.

$$T_{SK}^M = \frac{\pi}{K_A I_M} V_{MAX}, \text{ and} \tag{13}$$

$$X_{SK}^M = \frac{\pi}{2 K_A I_M} V_{MAX}^2. \tag{14}$$

When the seek length $X_{SK}$ exceeds the maximum seek length $X_{SK}^M$, a coast period must be introduced where the acceleration of the transducer is zero, so that the transducer velocity does not exceed the maximum value. The coast time can be defined by the following equation:

$$T_{CST} = \frac{X_{SK} - X_{SK}^M}{V_{MAX}}. \quad (15)$$

For a seek length greater than $X_{SK}^M$ the ideal position, ideal velocity, and ideal acceleration trajectories may be defined in (n) domain by the following equations.

$$a(n) = \frac{2\pi 2 X_{ACC}}{N_{SK}^{M2} T_{SM}^2} \sin\left(\frac{2\pi}{N_{SK}^M} n\right), \quad (16)$$

$$v(n) = \frac{2 X_{ACC}}{N_{SK}^M T_{SM}} \left[1 - \cos\left(\frac{2\pi}{N_{SK}^M} n\right)\right], \text{ and} \quad (17)$$

$$x(n) = \frac{2 X_{ACC}}{N_{SK}^M} n - \frac{2 X_{ACC}}{2\pi} \sin\left(\frac{2\pi}{N_{SK}^M} n\right) \quad (18)$$

when the transducer is accelerating;

$$a(n) = 0, \quad (19)$$

$$V(n) = V_{MAX}, \text{ and} \quad (20)$$

$$x(n) = X_{ACC} + V_{MAX} T_{SM}(n - N_{SK}^M/2) \quad (21)$$

when the transducer is coasting; and $$a(n) = \frac{2\pi 2 X_{DEC}}{N_{SK}^{M2} T_{SM}^2} \sin\left(\frac{2\pi}{N_{SK}^M}(n - N_{CST})\right), \quad (22)$$

$$v(n) = \frac{2 X_{DEC}}{N_{SK}^M T_{SM}} \left[1 - \cos\left(\frac{2\pi}{N_{SK}^M}(n - N_{CST})\right)\right], \text{ and} \quad (23)$$

$$x(n) = X_{ACC} + X_{CST} + \frac{2 X_{DEC}}{N_{SK}^M}(n - N_{CST} - N_{SK}^M/2) - \frac{2 X_{DEC}}{2\pi} \sin\left(\frac{2\pi}{N_{SK}^M}(n - N_{CST})\right) \quad (24)$$

when the transducer is decelerating
where;

$X_{CST} = T_{CST} V_{MAX}$ for $T_{CST}$ at coast phase, (25)

$X_{ACC} = (X_{SK} - X_{CST})/2$ for $T_{SK}^M/2$ at acceleration phase, and (26)

$X_{DEC} = X_{SK} - X_{ACC} - X_{CST}$ for $T_{SK}^M/2$ at deceleration phase. (27)

When the seek length exceeds $X_{SK}^M$, the controller computes the ideal position, ideal velocity, and ideal acceleration in accordance with equations (15) through (27), and then utilizes the ideal values in the control loop of FIG. 3.

Continuing to refer to FIG. 3, one embodiment of the disturbance cancellation block 80 will now be described. The disturbance signal $N_{rr}$ is an unknown sinusoidal signal and is defined as follows:

$$N_{rr} = \alpha \sin(\omega_{rr} t + c), \quad (28)$$

where
a is the amplitude,
$\omega_{rr}$ is the frequency, and
c is the phase offset.

I. SIGNAL GENERATOR

A repeatable signal with frequency $\omega$ can be generated as follows. Let $T_s$ be defined as the sampling time and the signal $x_1(k)$ be defined as:

$$x_1(k) = A \sin(\omega k T_s + \phi). \quad (29)$$

An orthogonal signal to $x_1(k)$ is of the form:

$$x_2(k) = A \cos(\omega k T_s + \phi). \quad (30)$$

At time k+1, $x_1(k+1) = \cos(\omega T_s) A \sin(\omega k T_s + \phi) + \sin(\omega T_s) A \cos(\omega k T_s + \phi),$ and (31)

$x_2(k+1) = \cos(\omega T_s) A \cos(\omega k T_s + \phi) - \sin(\omega T_s) A \sin(\omega k T_s + \phi).$ (32)

Equations (31) and (32) can be written in a more compact form as follows:

$$\begin{bmatrix} x_1(k+1) \\ x_2(k+1) \end{bmatrix} = \begin{bmatrix} \cos(\omega T_s) & \sin(\omega T_s) \\ -\sin(\omega T_s) & \cos(\omega T_s) \end{bmatrix} \begin{bmatrix} x_1(k) \\ x_2(k) \end{bmatrix}. \quad (33)$$

In general, the frequency $\omega$ is not constant and varies with time. To generalize, let:

$$\omega(k) = \omega_o + \delta\omega(k), \quad (34)$$

where,
$\omega_o$ is the nominal frequency, and
$\delta\omega(k)$ is the deviation frequency.

The augmented time-varying signal generator is defined as follows:

$$\begin{bmatrix} x_1(k+1) \\ x_2(k+1) \\ \delta\omega(k+1) \end{bmatrix} = \begin{bmatrix} c(k) & s(k) & 0 \\ -s(k) & c(k) & 0 \\ 0 & 0 & 1 \end{bmatrix} \begin{bmatrix} x_1(k) \\ x_2(k) \\ \delta\omega(k) \end{bmatrix} \quad (35)$$

where, $c(k) = \cos(\omega_o T_s + \delta\omega(k) T_s),$ and (36)

$s(k) = \sin(\omega_o T_s + \delta\omega(k) T_s).$ (37)

II. FREQUENCY ESTIMATOR

One important requirement to cancel non-synchronous disturbances is the ability to identify and track the frequency of the exogenous signal. To motivate the frequency estimation, let a first signal be $\sin(\theta)$ and a second signal be $\sin(\theta - \theta_e)$, that is, the second signal lags the first signal by $\theta_e$. Integrating the product of the first signal and a signal orthogonal to the second signal yields:

$$\int_{-\pi}^{\pi} \sin(\theta) \cos(\theta - \theta_e) d\theta = \pi \sin(\theta_e). \quad (38)$$

The above integration produces a value indicating the phase difference of the two signals that can be used to speed up/slow down the frequency of the second signal to achieve synchronization.

III. ESTIMATION AND CANCELLATION

The disturbance cancellation block 80 calculates the following during each iteration:

$$\begin{bmatrix} \hat{x}_1(k+1) \\ \hat{x}_2(k+1) \\ \delta\hat{\omega}(k+1) \end{bmatrix} = \begin{bmatrix} c(k) & s(k) & 0 \\ -s(k) & c(k) & 0 \\ 0 & 0 & 1 \end{bmatrix} \begin{bmatrix} \hat{x}_1(k) \\ \hat{x}_2(k) \\ \delta\hat{\omega}(k) \end{bmatrix} + \begin{bmatrix} \lambda_1 \\ \lambda_2 \\ \lambda_3 \hat{x}_2(k) \end{bmatrix} PES(k), \quad (39)$$

which expands to:

$$\hat{x}_1(k+1)=c(k)\hat{x}_1(k)+s(k)\hat{x}_2(k)+\lambda_2 PES(k), \text{ and} \quad (40)$$

$$\hat{x}_2(k+1)=-s(k)\hat{x}_1(k)+c(k)\hat{x}_2(k)+\lambda_2 PES(k), \text{ and} \quad (41)$$

$$\delta\hat{\omega}(k+1)=\delta\hat{\omega}(k)+\lambda_3\hat{x}_2(k)PES(k), \quad (42)$$

where, $\lambda_1$, $\lambda_2$, and $\lambda_3$ are design constants that may be set at different values. These constants may be determined empirically or by estimation techniques.

The output of the disturbance cancellation block 80 is:

$$u_{nrr}(k)=\hat{x}_1(k). \quad (43)$$

The disturbance cancellation block 80 provides a self-adjusting cancellation technique that iteratively calculates $U_{Nrr}$ until $U_{Nrr}$ tracks the disturbance signal $N_{rr}$. In essence, the iterative calculation of equations (40) to (42) provides a digital integration technique. Initially, the values $x_1(k)$, $x_2(k)$, and $\delta\omega(k)$ may be set to any value or zero. During each iteration, if the product $\lambda_3 x_2(k)PES(K)$ in equation (42) is positive, the frequency of the correcting signal $U_{Nrr}$ is increased, and if the product is negative, the frequency of the correcting signal $U_{Nrr}$ is decreased to cancel or minimize the disturbance signal $N_{rr}$.

IV. RESULTS

Figure 4:
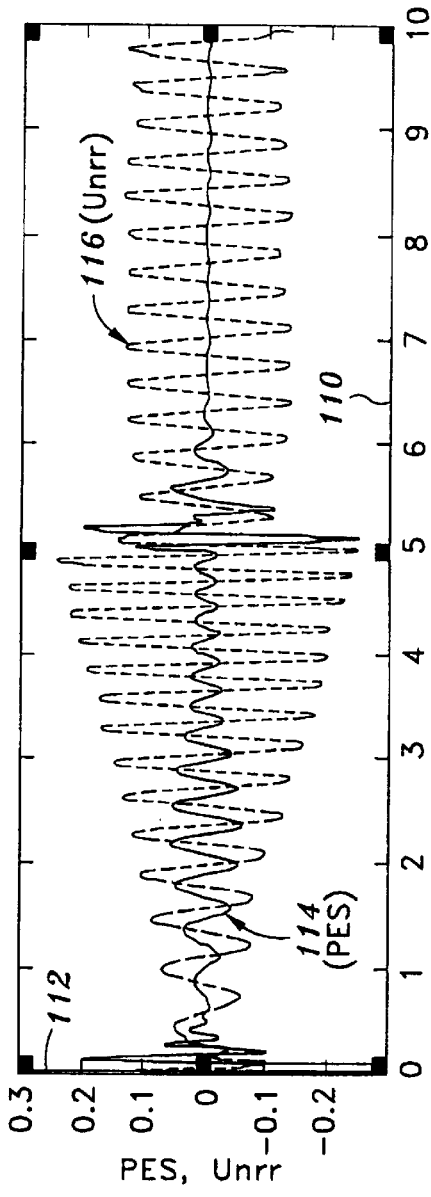
FIG. 4 shows a graph of the PES and disturbance correcting signals over a number of rotations.

The effectiveness of the disturbance cancellation block 80 according to one exemplary disturbance signal is shown in FIG. 4. As shown therein, the horizontal axis 110 defines the number of rotations of disk 12 while the vertical axis 112 defines the magnitude of the curves. Curve 114 represents the PES, while curve 116 represents the correcting signal $U_{Nrr}$, which is the output of the disturbance cancellation block 80. The frequency of the correcting signal $U_{Nrr}$ (curve 116) starts from about 170 Hz, increases at every sample up to the fifth rotation to about 340 Hz, and remains at the final frequency. The PES curve 114 gradually decreases as the correcting signal $U_{Nrr}$ increases. At the fifth rotation, the PES curve 114 exhibits a small transient when the correcting signal $U_{Nrr}$ stops changing frequency. About one rotation thereafter, the PES curve decreases rapidly to zero.

Figure 5:
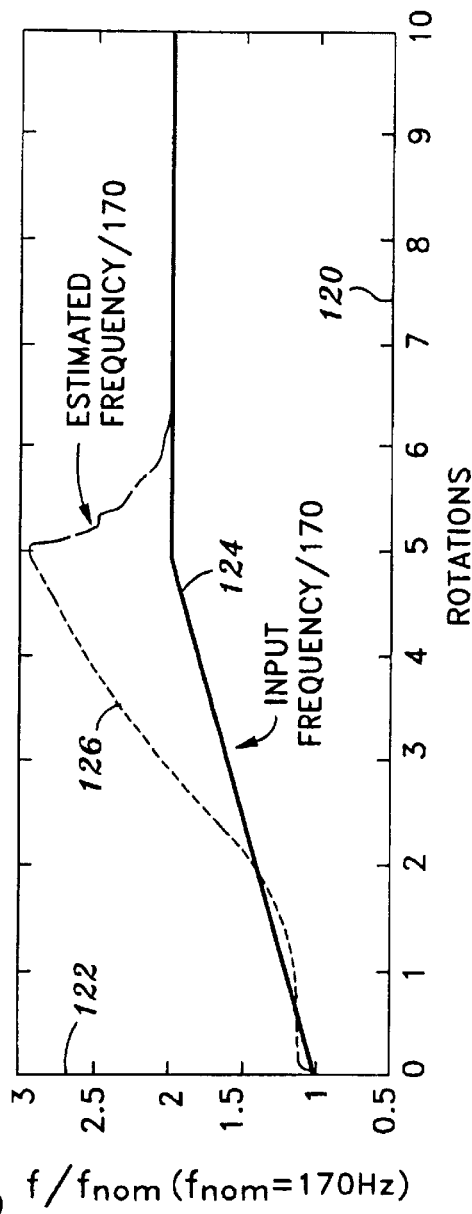
FIG. 5 shows a frequency graph of the PES and disturbance correcting signals.

FIG. 5 shows the frequency estimation process, according to the embodiment of FIG. 4. Referring to FIG. 5, the horizontal axis 120 defines the number of rotations, and the vertical axis 122 defines the frequency of the curves. Curve 124 represents the frequency of the PES, while curve 126 represents the frequency of the correcting signal $U_{Nrr}$. While the frequency curve 124 is ramping, the estimation is not as accurate because the frequency model does not account for a frequency ramp. Once the frequency curve 124 stabilizes, the estimation (curve 126) rapidly approaches the frequency model.

V. SIMPLIFICATION FOR IMPLEMENTATION

If the product $\delta\omega(k)T_s$ is small, e.g., due to small frequency variations and/or fast sampling frequencies, then the following identities can be made:

$$\cos(\omega_o T_s+\delta\omega(k)T_s)\approx\cos(\omega_o T_s)-\delta\omega(k)T_s\sin(\omega_o T_s), \text{ and}$$

$$\sin(\omega_o T_s+\delta\omega(k)T_s)\approx\sin(\omega_o T_s)+\delta\omega(k)T_s\cos(\omega_o T_s). \quad (44)$$

To further facilitate computation of the cancellation block 80, let $x_3(k)=\gamma\delta\omega T_s(k)$ as a state, with $\gamma$ as an appropriate scaling constant, to provide the following:

$$\begin{bmatrix} \hat{x}_1(k+1) \\ \hat{x}_2(k+1) \\ \hat{x}_3(k+1) \end{bmatrix} = \quad (45)$$

$$\begin{bmatrix} c_0 - s_0\dfrac{\hat{x}_3(k)}{\gamma} & s_0 + c_0\dfrac{\hat{x}_3(k)}{\gamma} & 0 \\ -s_0 - c_0\dfrac{\hat{x}_3(k)}{\gamma} & c_0 - s_0\dfrac{\hat{x}_3(k)}{\gamma} & 0 \\ 0 & 0 & 1 \end{bmatrix} \begin{bmatrix} \hat{x}_1(k) \\ \hat{x}_2(k) \\ \hat{x}_3(k) \end{bmatrix} + \begin{bmatrix} \lambda_1 \\ \lambda_2 \\ \lambda_3\hat{x}_2(k) \end{bmatrix} PES(k),$$

where, $c_o=\cos(\omega_o T_s)$, and $s_o=\sin(\omega_o T_s)$.

Equation (18) allows efficient computations by eliminating sine and cosine terms in the calculations. To ensure that the frequency estimate stays in a suitable range, the following restriction may be placed:

$$\text{If } (|\hat{x}_3(k+1)|>X3LIMIT), \text{ then } \hat{x}_3(k+1)=\hat{x}_3(k), \quad (46)$$

where X3LIMIT is a suitable positive number that reflects an expected range of frequency variations.

VI. WIDE-BAND DISTURBANCE

Figure 6:
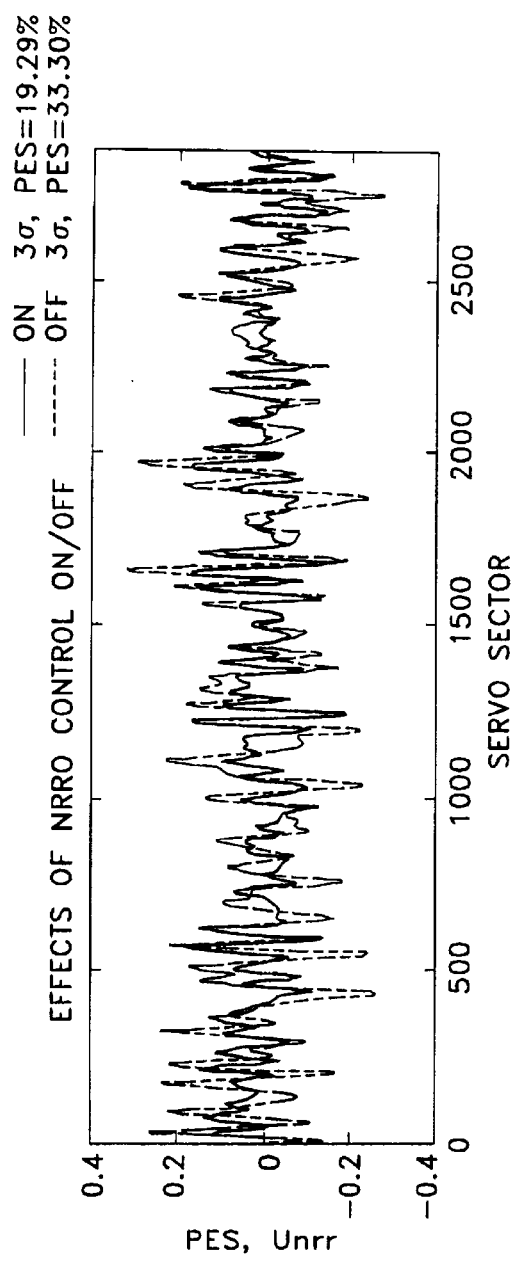
FIG. 6 shows a graph of the PES with and without the disturbance cancellation block enabled.
Figure 7:
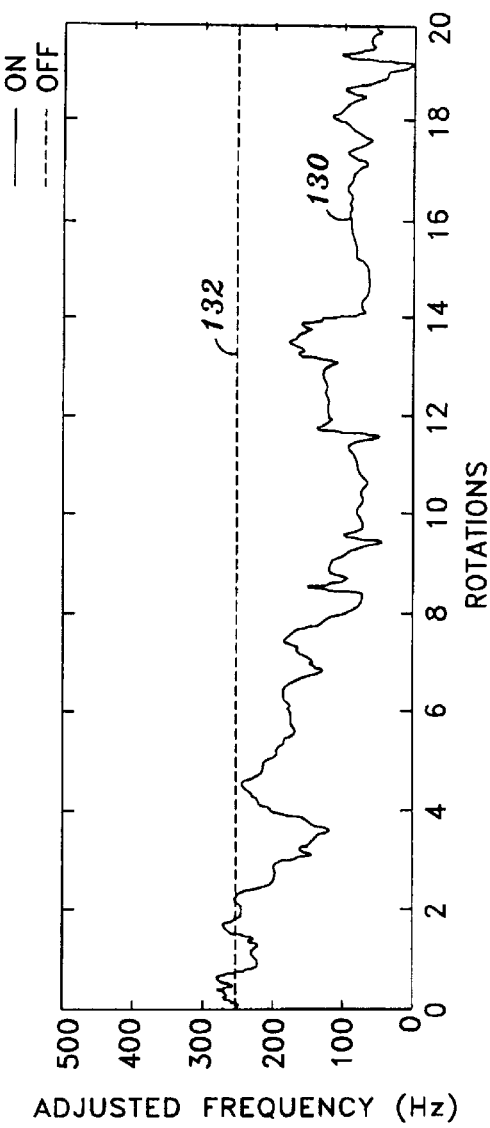
FIG. 7 shows a graph of the frequency adaptation of the PES over a number of rotations with and without the disturbance cancellation block enabled.

In general, mechanical systems are subjected to disturbances having energies over a wide frequency band. In particular, magnetic and optical disk-storage systems are usually stressed under very stringent operating vibrations with a bandwidth of about 500 Hz. FIGS. 6 and 7 show the behavior of the control system 60 when the cancellation block 80 is disabled and enabled, under external acceleration input with a bandwidth of 500 Hz. The simulations illustrated in FIGS. 6 and 7 emulate the positioning of a magnetic read/write head under operating random vibrations.

Referring to FIG. 6, the horizontal axis defines the servo sector number and the vertical axis defines the magnitude of the curves. The curves in FIG. 6 show that the 3σ PES can be reduced by more than 40% when the disturbance cancellation block 80 is enabled. In FIG. 7, the horizontal axis defines the number of rotations while the vertical axis defines the adjusted frequency of the curves. Curve 130 shows the frequency adaptation over 20 rotations, with the disturbance cancellation block 80 enabled, and curve 132 shows the frequency adaptation over 20 rotations with the disturbance cancellation block 80 disabled.

Figure 8:
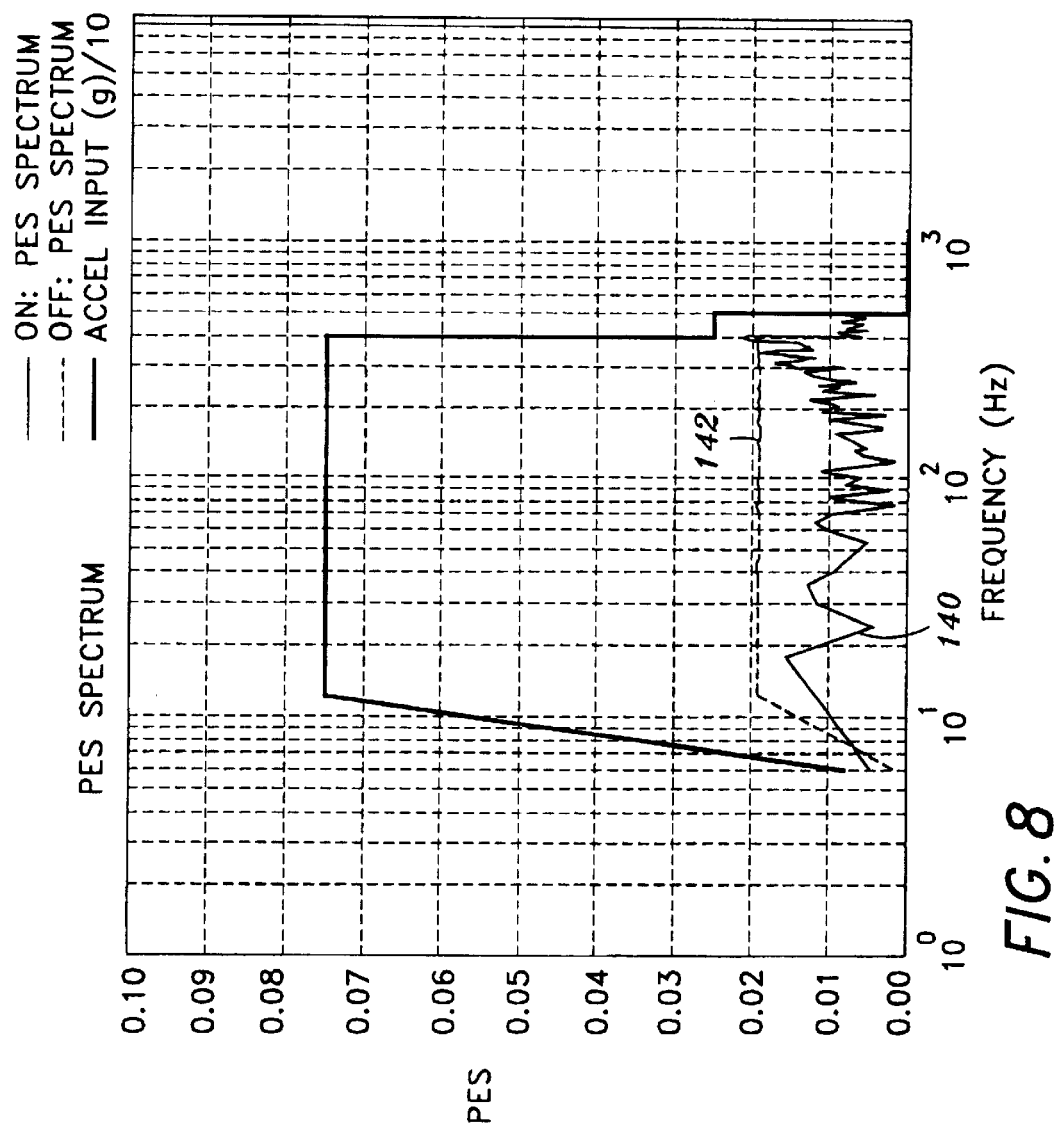
FIG. 8 shows the spectrum of the external acceleration input disturbance to the positioning head and the PES spectrum with and without the disturbance cancellation block enabled.

FIG. 8 shows the spectrum of the external acceleration input disturbance to the positioning head and the PES spectrum with and without the disturbance cancellation block 80 enabled. When block 80 is enabled, the PES spectrum (curve 140) shows a significant wide-band reduction within the vibration bandwidth, as opposed to the PES spectrum (curve 142) when block 80 is disabled. The acceleration input disturbance is generated by first defining the desired magnitude profile in frequency domain. Each positive frequency is then given a random phase. The negative frequencies are the complex conjugates of the positive frequencies to ensure a real signal is obtained when the spectrum is inverse Fourier transformed to time domain.

One or more embodiments disclosed herein provide a simple, yet extremely effective scheme to identify and reject or minimize external, non-synchronous disturbances. The one or more embodiments can be used to (i) identify and reject or minimize disturbances that have unknown amplitudes and/or frequencies that may change slowly with temperature and/or mechanical loads or tolerances, (ii) track and reject or minimize disturbances with frequencies that continuously vary, as when a mechanical system is subjected to operating sinusoidal vibrations, and/or (iii) provide wideband rejection to random external vibrations that have a wide bandwidth.

One or more embodiments may be implemented as a method, apparatus, system, computer program product, etc. When implemented in software, the elements are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A rotating disk storage device, comprising:
    a disk which has a surface;
    a spindle motor that rotates said disk;
    a transducer which can write information onto said disk and read information from said disk;
    an actuator arm that can move said transducer across said surface of said disk; and
    a controller to (i) control the movement of the actuator arm to move said transducer across said disk surface from a first track to a second track, (ii) determine a position error signal at one or more positions between the first and second tracks, said position error signal including a non-repeatable disturbance signal, (iii) iteratively generate a disturbance correction signal at the one or more positions based on the position error signal, (iv) combine the disturbance correction signal with the position error signal to minimize the non-repeatable disturbance signal to provide a corrected position error signal, and (v) vary, at the one or more positions, the movement of the transducer as a function of the corrected position error signal.

2. The rotating disk storage device of claim 1 wherein the position error signal is determined based on a design position of the transducer, an actual position of the transducer, and the non-repeatable disturbance signal.

3. The rotating disk storage device of claim 2 wherein the controller further computes a design velocity and a design acceleration of the transducer, determines an actual velocity and actual acceleration of the transducer, generates a velocity correction value that is a function of the design velocity, the actual velocity, and the corrected position error signal, generates a feedforward acceleration value that is a function of the actual acceleration value, generates an acceleration correction value that is a function of the velocity correction value, the feedforward acceleration value, and the design acceleration, and varies the movement of the transducer in response to the acceleration correction value.

4. The rotating disk storage device of claim 1, wherein the controller iteratively generates the disturbance correction signal at the one or more positions based on the position error signal by:
    multiplying the position error signal with an orthogonal signal that is orthogonal to the disturbance correction signal to provide a first intermediate value and adding the first intermediate value to a delta signal from a previous iteration to provide an updated delta signal; and
    updating the correction signal as a function of the disturbance correction signal, the orthogonal signal, the delta signal, and the position error signal.

5. The rotating disk storage device of claim 4, wherein the controller iteratively generates the disturbance correction signal at the one or more positions based on the position error signal by further:
    updating the orthogonal signal as a function of the disturbance correction signal, the orthogonal signal, the delta signal, and the position error signal.

6. The rotating disk storage device of claim 1, wherein the non-repeatable disturbance signal is caused by external vibrations.

7. A computer program product, comprising:
    a computer usable medium having computer readable program code embodied therein to move a transducer that is coupled to an actuator arm across a surface of a disk in a rotating disk storage device, the computer readable program code in said computer program product comprising:
        first computer readable program code to move the transducer across the disk surface from a first track to a second track;
        second computer readable program code to compute a design position of the transducer at a plurality of positions between the first and second tracks;
        third computer readable program code to determine an actual position of the transducer at the plurality of positions between the first and second tracks;
        fourth computer readable program code to generate, at each position, a position error signal that is a function of the design position and the actual position and a non-synchronous disturbance signal;
        fifth computer readable program code to generate, at each position, a disturbance correction signal based on the position error signal;
        sixth computer readable program code to provide, at each position, a corrected position error signal that is function of the position error signal and the disturbance correction signal, said disturbance correction signal to substantially cancel said non-synchronous disturbance signal; and
        seventh computer readable program code to vary, at one or more positions, the movement of the transducer in response to the corrected position error signal.

8. The computer program product of claim 7 further comprising:
    computer readable program code to compute a design velocity and a design acceleration of the transducer;
    computer readable program code to determine an actual velocity and actual acceleration of the transducer;
    computer readable program code to generate a velocity correction value that is a function of the design velocity, the actual velocity, and the corrected position error signal;

computer readable program code to generate a feedforward acceleration value that is a function of the actual acceleration value;

computer readable program code to generate an acceleration correction value that is a function of the velocity correction value, the feedforward acceleration value, and the design acceleration; and computer readable program code to vary the movement of the transducer in response to the acceleration correction value.

9. The computer program product of claim 7 wherein said fifth computer readable program code comprises:

computer readable program code to multiply the position error signal with an orthogonal signal that is orthogonal to the disturbance correction signal to provide a first intermediate value and add the first intermediate value to a delta signal from a previous iteration to provide an updated delta signal; and computer readable program code to update the correction signal as a function of the disturbance correction signal, the orthogonal signal, the delta signal, and the position error signal.

10. The computer program product of claim 9 wherein said fifth computer readable program code further comprises:

computer readable program code to update the orthogonal signal as a function of the disturbance correction signal, the orthogonal signal, the delta signal, and the position error signal.

11. The computer program product of claim 7, wherein the non-synchronous disturbance signal is caused by external vibrations.

12. A method for moving a transducer across a surface of a disk in a rotating disk storage device, wherein said device is subjected to a non-synchronous disturbance signal, the method comprising:

moving the transducer across the disk surface;

computing a design position of the transducer;

determining an actual position of the transducer;

generating a position error signal at a plurality of positions between a source track and a destination track, said position error signal being a function of the design position, the actual position, and the non-synchronous disturbance signal;

generating a disturbance correction signal, at the plurality of positions, that is a function of the position error signal;

providing a corrected position error signal, at the plurality of positions, that is function of the position error signal and the disturbance correction signal, said disturbance correction signal substantially canceling said non-synchronous disturbance signal; and varying the movement of the transducer in response to the corrected position error signal.

13. The method of claim 12, wherein generating the correction signal based on the position error signal comprises:

multiplying the position error signal with an orthogonal signal that is orthogonal to the disturbance correction signal to provide a first intermediate value and adding the first intermediate value to a delta signal from a previous iteration to provide an updated delta signal; and updating the correction signal as a function of the disturbance correction signal, the orthogonal signal, the delta signal, and the position error signal.

14. The method of claim 13 further comprising:

updating the orthogonal signal as a function of the disturbance correction signal, the orthogonal signal, the delta signal, and the position error signal.

15. The method of claim 12, wherein prior to varying, the method comprises:

computing a design velocity and a design acceleration of the transducer;

determining an actual velocity and actual acceleration of the transducer;

generating a velocity correction value that is a function of the design velocity, the actual velocity, and the corrected position error signal;

generating a feedforward acceleration value that is a function of the actual acceleration value; and generating an acceleration correction value that is a function of the velocity correction value, the feedforward acceleration value, and the design acceleration, and wherein varying comprises varying the movement of the transducer in response to the acceleration correction value.

* * * * *